(12) United States Patent
Huang et al.

(10) Patent No.: US 11,807,964 B2
(45) Date of Patent: Nov. 7, 2023

(54) PLANT-BASED FUNCTIONAL POLYPROPYLENE SPUNBOND NON-WOVEN FABRIC AND PREPARATION METHOD THEREOF

(71) Applicant: BESTEE MATERIAL (TSINGTAO) CO., LTD., Qingdao (CN)

(72) Inventors: Xiaohua Huang, Qingdao (CN); Xiaoqian Huang, Qingdao (CN); Yu Liu, Qingdao (CN); Jie Liu, Qingdao (CN); Xiaolong Huang, Qingdao (CN); Li Zhen, Qingdao (CN)

(73) Assignee: BESTEE MATERIAL (TSINGTAO) CO., LTD., Qingdao (CN)

( * ) Notice: Subject to any disclaimer, the term of this patent is extended or adjusted under 35 U.S.C. 154(b) by 258 days.

(21) Appl. No.: 17/009,015

(22) Filed: Sep. 1, 2020

(65) Prior Publication Data

US 2021/0062380 A1   Mar. 4, 2021

(30) Foreign Application Priority Data

Sep. 2, 2019 (CN) .......................... 201910822105.8

(51) Int. Cl.
| | |
|---|---|
| *D01F 1/10* | (2006.01) |
| *D04H 3/16* | (2006.01) |
| *D01F 6/46* | (2006.01) |
| *D04H 3/007* | (2012.01) |

(52) U.S. Cl.
CPC ............... *D04H 3/16* (2013.01); *D01F 1/10* (2013.01); *D01F 6/46* (2013.01); *D04H 3/007* (2013.01)

(58) Field of Classification Search
CPC ...................................................... D01F 1/10
See application file for complete search history.

(56) References Cited

U.S. PATENT DOCUMENTS

| | | | | |
|---|---|---|---|---|
| 4,578,414 A | * | 3/1986 | Sawyer ................ | C08K 5/13 524/375 |
| 10,016,354 B2 | * | 7/2018 | Konradi ................ | A61K 8/84 |
| 2003/0100236 A1 | * | 5/2003 | Seth ..................... | C11D 17/049 442/400 |
| 2003/0152588 A1 | * | 8/2003 | Huang .................. | A61K 36/65 424/773 |
| 2004/0062735 A1 | * | 4/2004 | Sun ...................... | A61K 8/22 424/443 |
| 2004/0242097 A1 | * | 12/2004 | Hasenoehrl .......... | A44B 18/0011 442/361 |
| 2005/0142094 A1 | * | 6/2005 | Kumar .................. | A61Q 1/04 514/20.4 |
| 2005/0276828 A1 | * | 12/2005 | Grissett ................ | A61K 8/0208 510/130 |
| 2005/0277568 A1 | * | 12/2005 | Keenan ................ | C11D 17/041 510/438 |
| 2007/0049512 A1 | * | 3/2007 | Keenan ................ | C11D 17/006 510/439 |
| 2008/0075748 A1 | * | 3/2008 | Hasenoehrl .......... | A47K 10/16 514/789 |
| 2009/0214606 A1 | * | 8/2009 | Bujard .................. | A01N 59/16 424/617 |
| 2009/0269772 A1 | * | 10/2009 | Califano .............. | G16B 5/20 707/E17.014 |
| 2012/0048769 A1 | * | 3/2012 | Sivik .................... | A61Q 5/00 206/524.1 |
| 2012/0053108 A1 | * | 3/2012 | Glenn, Jr. ............. | B08B 9/20 510/298 |
| 2012/0077886 A1 | * | 3/2012 | Scholz .................. | A61P 17/02 502/4 |
| 2012/0215148 A1 | * | 8/2012 | Ewert ................... | D01F 2/00 264/103 |
| 2013/0043613 A1 | * | 2/2013 | Kawasoe .............. | C08J 5/18 264/49 |
| 2013/0115185 A1 | * | 5/2013 | Tamareselvy ........ | A61Q 19/10 424/70.16 |
| 2014/0050694 A1 | * | 2/2014 | Mezrich ............... | A61K 45/06 424/134.1 |
| 2014/0094630 A1 | * | 4/2014 | Anton ................... | C12P 21/06 568/918 |
| 2014/0169856 A1 | * | 6/2014 | Doering ............... | A61K 8/19 401/55 |
| 2015/0353663 A1 | * | 12/2015 | Liu ....................... | C09D 133/10 424/59 |
| 2017/0253846 A1 | * | 9/2017 | Bernfeld .............. | B08B 9/08 |
| 2018/0369129 A1 | * | 12/2018 | Weiss ................... | A61Q 5/02 |
| 2019/0193032 A1 | * | 6/2019 | Shimada .............. | D04H 3/033 |
| 2020/0155641 A1 | * | 5/2020 | Ip ......................... | A61K 31/192 |
| 2021/0062380 A1 | * | 3/2021 | Huang .................. | D01F 1/10 |

\* cited by examiner

*Primary Examiner* — Andrew D Graham
(74) *Attorney, Agent, or Firm* — ANOVA LAW GROUP, PLLC

(57) ABSTRACT

A plant-based functional polypropylene spunbond non-woven fabric and a preparation method of the plant-based functional polypropylene spunbond non-woven fabric are provided. The plant-based functional polypropylene spunbond non-woven fabric contains a plant herb water-soluble extract in a weight percentage range of approximately 0.2%-1.5%. The plant-based functional polypropylene spunbond non-woven fabric has moisture regain in a range of approximately 0.2%-3%, a longitudinal breaking strength of approximately ≥18.5 N/5 cm, a transverse breaking strength of approximately ≤9.5 N/5 cm, a thickness in a range of approximately 0.2 mm-0.5 mm, a weight per unit area in a range of approximately 20 g/m2-40 g/m2, and a fiber diameter in a range of approximately 10 μm-30 μm.

13 Claims, No Drawings

PLANT-BASED FUNCTIONAL POLYPROPYLENE SPUNBOND NON-WOVEN FABRIC AND PREPARATION METHOD THEREOF

CROSS-REFERENCE TO RELATED APPLICATION

This application claims the priority of Chinese patent application No. 201910822105.8, filed on Sep. 2, 2019, the entirety of which is incorporated herein by reference.

FIELD OF THE DISCLOSURE

The present disclosure generally relates to the field of non-woven fabric technology and, more particularly, relates to a plant-based functional polypropylene spunbond non-woven fabric and a preparation method thereof.

BACKGROUND

The polypropylene (PP) spunbond non-woven fabric is prepared using polypropylene as a raw material, and has a breathable rather than water-permeable fiber structure prepared by a high-temperature spinning carding and bonding into a web. The PP spunbond non-woven fabric is mainly used for disposable medical and hygiene product, disposable antifouling fabricing, agricultural fabric, furniture fabric, or lining material, etc. The surface layer of existing hygiene product made of PP spunbond non-woven fabric is mostly perforated film, hot-air non-woven fabric, and pure cotton spunlace non-woven fabric.

Because the current spunbond non-woven fabrics are synthetic fiber products made of Polyethylene (PET) or PP, the non-woven fabric product has poor hygroscopicity and low moisture regain. Even the polyester fiber product has a slight water absorption effect, the moisture regain thereof is not greater than 1%. Therefore, the poor hygroscopicity of synthetic fiber non-woven fabric limits its application. At the same time, the raw material of the spunbond non-woven fabric determines the dry, hard and rough characteristics of the non-woven fabric product.

Chinese patent publication No. CN108560149A discloses a high-performance antibacterial polypropylene spunbond non-woven fabric preparation method, which relates to a field of non-woven fabric processing technology. The preparation method includes following steps: (1) preparation of carboxylated polypropylene, (2) antibacterial modification of the polypropylene, (3) fiber web processing, and (4) non-woven fabric molding. The polypropylene spunbond non-woven fabric in such patent not only has significant stable, long-last antibacterial performance, but also has high mechanical strength, desired breathability, and is non-toxic and harmless. The polypropylene spunbond non-woven fabric in such patent is suitable for producing medical and hygiene products such as surgical gown, bed sheet, urine pad, isolation gown, visiting gown, etc. Such patent mainly solves the antibacterial technical problem of the polypropylene fiber.

Chinese patent publication No. CN109642378A discloses a spunbond non-woven fabric. Such spunbond non-woven fabric has a smooth surface, is rarely cured along a width direction caused by the difference between the surface and the back-surface, and has desired film forming properties and film adhesion performance. For example, when casting a resin solution, the resin solution cannot penetrate through the fabric, the membrane material cannot be peeled off, and unevenness, pinhole or any other defect due to the fluffing of the support cannot be formed. Such patent mainly solves the technical problems of surface curling and film adhesion of the non-woven fabric, but does not solve the technical problems of air-impermeable, low moisture regain, and roughness of the existing spunbond non-woven fabric.

Therefore, to solve the above technical problems, a breathable, moisture-absorbing, super-soft, and smooth PP spunbond non-woven fabric product is urgently needed to be developed. The disclosed methods and non-woven fabric are directed to solve one or more problems set forth above and other problems.

BRIEF SUMMARY OF THE DISCLOSURE

One aspect of the present disclosure includes a plant-based functional polypropylene spunbond non-woven fabric. The plant-based functional polypropylene spunbond non-woven fabric contains a plant herb water-soluble extract in a weight percentage range of approximately 0.2%-1.5%.

In one embodiment, the plant-based functional polypropylene spunbond non-woven fabric has moisture regain in a range of approximately 0.2%-3%, a longitudinal breaking strength of approximately $\geq 18.5$ N/5 cm, and a transverse breaking strength of approximately $\leq 9.5$ N/5 cm.

In one embodiment, the plant-based functional polypropylene spunbond non-woven fabric has a thickness in a range of approximately 0.2 mm-0.5 mm, a weight per unit area in a range of approximately 20 g/m$^2$-40 g/m$^2$, and a fiber diameter in a range of approximately 10 μm-30 μm.

In one embodiment, the plant herb water-soluble extract includes a honeysuckle extract, a mint extract, a wormwood extract, an echinacea polyphenols extract, an apple extract, a rose extract, a grass coral extract, a raspberry extract, a mulberry extract, a cinnamon extract, a ginger extract, an angelica extract, or a combination thereof.

In one embodiment, the plant-based functional polypropylene spunbond non-woven fabric further contains a polypropylene resin as a raw material, antioxidants for preventing the plant herb water-soluble extract from changing color at a high temperature, and a modifier for improving the dispersibility of the plant herb water-soluble extract in the polypropylene resin.

Another aspect of the present disclosure includes a method for preparing a plant-based functional polypropylene spunbond non-woven fabric. The method includes preparing a modified plant-based functional polypropylene masterbatch, including: melting a polypropylene resin, adding antioxidants into the polypropylene resin, and after adding the antioxidants, adding a modifier and a plant herb water-soluble extract into the polypropylene resin.

In one embodiment, a melting temperature is in a range of approximately 195° C.-220° C. After adding the antioxidants, the polypropylene resin is stirred at approximately 800 rad/min-1000 rad/min for approximately 10 minutes-15 minutes. When adding the modifier and the plant herb water-soluble extract, the polypropylene resin is stirred at a high speed for approximately 20 minutes-40 minutes and cooled to approximately 180° C.-190° C.

In one embodiment, the antioxidants include dihydrotanshinone I, epicatechin and glycerin.

In one embodiment, a mass ratio of dihydrotanshinone I, epicatechin, and glycerin is approximately (1-5):(1-3):(3-10).

In one embodiment, the modifier includes sodium-n-methyl-n-oleyl taurate and cocamidopropyl betaine, and a mass ratio of sodium-n-methyl-n-oleyl taurate and cocamidopropyl betaine is approximately (0.1-0.5):(0.5-3).

In one embodiment, the method further includes mixing the modified plant-based functional polypropylene masterbatch with a polypropylene raw material to obtain a mixture, where a mass ratio of the plant herb water-soluble extract in the plant-based functional polypropylene masterbatch over the polypropylene raw material is in a range of approximately 0.2%-1.5%; and preparing a spinning melt by melting the mixture.

In one embodiment, the method further includes a spinning process, including using a screw extruder, extruding the spinning melt from a spinning port in a spunbond manner, to prepare a polypropylene fiber bundle; and a post-processing process, including pressure-rolling, hot-rolling. A temperature of a roller is in a range of approximately 140° C.-165° C., a pressure is in a range of approximately 56 d/cm-70 d/cm, and a temperature of the hot-rolling is in a range of approximately 160° C.-170° C.

In one embodiment, a diameter of the spinning port is in a range of approximately 10 μm-30 μm.

In one embodiment, the method further includes an oiling process, where an oil includes polyvinylpyrrolidone and emulsified silicone oil, and a mass ratio of the polyvinylpyrrolidone and the emulsified silicone oil is in a range of approximately (1-3):(3-9).

In one embodiment, the plant herb water-soluble extract includes a honeysuckle extract, a mint extract, a wormwood extract, an echinacea polyphenols extract, an apple extract, a rose extract, a grass coral extract, a raspberry extract, a mulberry extract, a cinnamon extract, a ginger extract, an angelica extract, or a combination thereof.

In one embodiment, a mass ratio of the modifier and the plant herb water-soluble extract is in a range of approximately (0.1-0.5):(8-10).

In one embodiment, the method further includes a hot rolling with a pattern roller, where a temperature of the hot rolling is in a range of approximately 160° C.-168° C.

In one embodiment, the plant-based functional polypropylene spunbond non-woven fabric has moisture regain in a range of approximately 0.2%-3%, a longitudinal breaking strength of approximately ⩾ 18.5 N/5 cm, and a transverse breaking strength of approximately ⩽ 9.5 N/5 cm.

In one embodiment, the plant-based functional polypropylene spunbond non-woven fabric has a thickness in a range of approximately 0.2 mm-0.5 mm, a weight per unit area in a range of approximately 20 g/m²-40 g/m², and a fiber diameter in a range of approximately 10 μm-30 μm.

Another aspect of the present disclosure includes a plant-based functional polypropylene spunbond non-woven fabric prepared by the above-disclosed method.

Other aspects of the present disclosure can be understood by those skilled in the art in light of the description, the claims, and the drawings of the present disclosure.

DETAILED DESCRIPTION

Exemplary Embodiment 1

The present disclosure provides a plant-based functional polypropylene (PP) spunbond non-woven fabric. The plant-based functional PP spunbond non-woven fabric may contain 0.2% (weight percentage) plant herb water-soluble extract. The plant-based functional PP spunbond non-woven fabric may have a moisture regain of approximately 0.4%, a longitudinal breaking strength of approximately 28.9 N/5 cm; and a transverse breaking strength of approximately 4.8 N/5 cm. In the prepared plant-based functional PP spunbond non-woven fabric, a thickness of the PP fiber non-woven fabric may be approximately 0.2 mm, a weight per unit area may be approximately 30 g/m², and a diameter of the PP fiber may be approximately 12 μm.

Exemplary Embodiment 2

The present disclosure provides a plant-based functional polypropylene (PP) spunbond non-woven fabric. The plant-based functional PP spunbond non-woven fabric may contain 0.6% (weight percentage) plant herb water-soluble extract. The plant-based functional PP spunbond non-woven fabric may have a moisture regain of approximately 1.1%, a longitudinal breaking strength of approximately 27.1 N/5 cm; and a transverse breaking strength of approximately 5.2 N/5 cm. In the prepared plant-based functional PP spunbond non-woven fabric, a thickness of the PP fiber non-woven fabric may be approximately 0.3 mm, a weight per unit area may be approximately 30 g/m², and a diameter of the PP fiber may be approximately 15 μm.

Exemplary Embodiment 3

The present disclosure provides a plant-based functional polypropylene (PP) spunbond non-woven fabric. The plant-based functional PP spunbond non-woven fabric may contain 1.0% (weight percentage) plant herb water-soluble extract. The plant-based functional PP spunbond non-woven fabric may have a moisture regain of approximately 1.6%, a longitudinal breaking strength of approximately 26.5 N/5 cm; and a transverse breaking strength of approximately 4.9 N/5 cm. In the prepared plant-based functional PP spunbond non-woven fabric, a thickness of the PP fiber non-woven fabric may be approximately 0.2 mm, a weight per unit area may be approximately 30 g/m², and a diameter of the PP fiber may be approximately 12 μm.

Exemplary Embodiment 4

The present disclosure provides a plant-based functional polypropylene (PP) spunbond non-woven fabric. The plant-based functional PP spunbond non-woven fabric may contain 1.2% (weight percentage) plant herb water-soluble extract. The plant-based functional PP spunbond non-woven fabric may have a moisture regain of approximately 2.0%, a longitudinal breaking strength of approximately 26.0 N/5 cm; and a transverse breaking strength of approximately 4.5 N/5 cm. In the prepared plant-based functional PP spunbond non-woven fabric, a thickness of the PP fiber non-woven fabric may be approximately 0.2 mm, a weight per unit area may be approximately 30 g/m², and a diameter of the PP fiber may be approximately 10 μm.

Exemplary Embodiment 5

The present disclosure provides a plant-based functional polypropylene (PP) spunbond non-woven fabric. The plant-based functional PP spunbond non-woven fabric may contain 1.5% (weight percentage) plant herb water-soluble extract. The plant-based functional PP spunbond non-woven fabric may have a moisture regain of approximately 2.6%, a longitudinal breaking strength of approximately 25.8 N/5 cm; and a transverse breaking strength of approximately 4.2 N/5 cm. In the prepared plant-based functional PP spunbond non-woven fabric, a thickness of the PP fiber non-woven fabric may be approximately 0.5 mm, a weight per unit area may be approximately 30 g/m², and a diameter of the PP fiber may be approximately 20 μm.

Exemplary Embodiment 6

The present disclosure provides a preparation method of a plant-based functional polypropylene (PP) spunbond non-woven fabric. The preparation method may include following.

Step 1: Preparation of Modified Plant-Based Functional PP Masterbatch.

The polypropylene resin may be melted at a temperature of approximately 200° C. Antioxidants may be first added to the molten polypropylene resin, and then the molten polypropylene resin may be stirred at 800 rad/min for approximately 10 minutes-12 minutes to enable the components to be fully mixed. Modifier and water-soluble plant extract may be added to the molten polypropylene resin, and then the molten polypropylene resin may be stirred at a high speed for approximately 20 minutes to obtain a mixture and cooled to approximately 185° C.-190° C. Ultimately, the mixture may be extruded to obtain the modified plant-based functional polypropylene masterbatch.

Antioxidants may include dihydrotanshinone I, epicatechin and glycerin, and a mass ratio of dihydrotanshinone I, epicatechin, and glycerin in antioxidants may be approximately 1:1:3. Modifier may include sodium-n-methyl-n-oleyl taurate and cocamidopropyl betaine, and a mass ratio of sodium-n-methyl-n-oleyl taurate and cocamidopropyl betaine in the modifier may be approximately 1:5. A mass ratio of the modifier and the water-soluble plant extract may be approximately 0.1:8.

Step 2: Mixing.

The plant-based functional polypropylene masterbatch prepared in step 1 may be mixed with the conventional polypropylene raw material according to a mass ratio of the water-soluble plant extract in the plant-based functional polypropylene masterbatch over the total mass of the raw material of 0.2%, and a spinning melt may be prepared by melting.

Step 3: Spinning and Post-Processing.

Using a screw extruder, after the mixture material prepared in step 2 is melted and extruded by a screw, the melt may be extruded from a spinning port in a spunbond manner, to obtain a PP fiber bundle. A diameter of the spinning port may be approximately 15 μm.

The PP fiber bundle prepared in step 3 may ultimately form finished product through towing, netting, pressure-rolling, hot-rolling, winding, and inverted-cloth-slitting, and may be put into storage.

An oiling process may be performed on the towed fiber. The oil may include polyvinylpyrrolidone and emulsified silicone oil, and a mass ratio of polyvinylpyrrolidone and emulsified silicone oil in the oil may be approximately 1:5.

A temperature of the roller may be approximately 140° C.-142° C., a pressure may be approximately 56 d/cm-60 d/cm, and a temperature of the hot-rolling may be approximately 160° C.-162° C.

A mixed fiber layer may be prepared by mixed laying, and the plant-based functional PP spunbond non-woven fabric may be obtained by hot-rolling with a pattern roller. A temperature of the hot-rolling may be approximately 160° C.-162° C. The obtained PP fiber non-woven fabric may have a ratio of the longitudinal over transverse breaking strength of 6.02.

Exemplary Embodiment 7

The present disclosure provides a preparation method of a plant-based functional polypropylene (PP) spunbond non-woven fabric. The preparation method may include following.

Step 1: Preparation of Modified Plant-Based Functional PP Masterbatch.

The polypropylene resin may be melted at a temperature of approximately 200° C. Antioxidants may be first added to the molten polypropylene resin, and then the molten polypropylene resin may be stirred at 800 rad/min for approximately 10 minutes-12 minutes to enable the components to be fully mixed. Modifier and water-soluble plant extract may be added to the molten polypropylene resin, and then the molten polypropylene resin may be stirred at a high speed for approximately 20 minutes-25 minutes to obtain a mixture and cooled to approximately 185° C.-187° C. Ultimately, the mixture may be extruded to obtain the modified plant-based functional polypropylene masterbatch.

Antioxidants may include dihydrotanshinone I, epicatechin and glycerin, and a mass ratio of dihydrotanshinone I, epicatechin, and glycerin in antioxidants may be approximately 2:1:3. Modifier may include sodium-n-methyl-n-oleyl taurate and cocamidopropyl betaine, and a mass ratio of sodium-n-methyl-n-oleyl taurate and cocamidopropyl betaine in the modifier may be approximately 1:10. A mass ratio of the modifier and the water-soluble plant extract may be approximately 0.1:9.

Step 2: Mixing.

The plant-based functional polypropylene masterbatch prepared in step 1 may be mixed with the conventional polypropylene raw material according to a mass ratio of the water-soluble plant extract in the plant-based functional polypropylene masterbatch over the total mass of the raw material of 0.6%, and a spinning melt may be prepared by melting.

Step 3: Spinning and Post-Processing.

Using a screw extruder, after the mixture material prepared in step 2 is melted and extruded by a screw, the melt may be extruded from a spinning port in a spunbond manner, to obtain a PP fiber bundle. A diameter of the spinning port may be approximately 15 μm.

The PP fiber bundle prepared in step 3 may ultimately form finished product through towing, netting, pressure-rolling, hot-rolling, winding, and inverted-cloth-slitting, and may be put into storage.

An oiling process may be performed on the towed fiber. The oil may include polyvinylpyrrolidone and emulsified silicone oil, and a mass ratio of polyvinylpyrrolidone and emulsified silicone oil in the oil may be approximately 3:5.

A temperature of the roller may be approximately 150° C.-155° C., a pressure may be approximately 56 d/cm, and a temperature of the hot-rolling may be approximately 160° C.

A mixed fiber layer may be prepared by mixed laying, and the plant-based functional PP spunbond non-woven fabric may be obtained by hot-rolling with a pattern roller. A temperature of hot-rolling may be approximately 165° C.-168° C. The obtained PP fiber non-woven fabric may have a ratio of a longitudinal over transverse breaking strength of 5.21.

Exemplary Embodiment 8

The present disclosure provides a preparation method of a plant-based functional polypropylene (PP) spunbond non-woven fabric. The preparation method may include following.

Step 1: Preparation of Modified Plant-Based Functional PP masterbatch.

The polypropylene resin may be melted at a temperature of approximately 210° C. Antioxidants may be first added to the molten polypropylene resin, and then the molten polypropylene resin may be stirred at 800 rad/min for approximately 15 minutes to enable the components to be fully mixed. Modifier and water-soluble plant extract may be added to the molten polypropylene resin, and then the molten polypropylene resin may be stirred at a high speed for approximately 20 minutes to obtain a mixture and cooled to approximately 190° C. Ultimately, the mixture may be extruded to obtain the modified plant-based functional polypropylene masterbatch.

Antioxidants may include dihydrotanshinone I, epicatechin and glycerin, and a mass ratio of dihydrotanshinone I, epicatechin, and glycerin in antioxidants may be approximately 3:3:10. Modifier may include sodium-n-methyl-n-oleyl taurate and cocamidopropyl betaine, and a mass ratio of sodium-n-methyl-n-oleyl taurate and cocamidopropyl betaine in the modifier may be approximately 1:5. A mass ratio of the modifier and the water-soluble plant extract may be approximately 0.3:8.

Step 2: Mixing.

The plant-based functional polypropylene masterbatch prepared in step 1 may be mixed with the conventional polypropylene raw material according to a mass ratio of the water-soluble plant extract in the plant-based functional polypropylene masterbatch over the total mass of the raw material of 1.0%, and a spinning melt may be prepared by melting.

Step 3: Spinning and Post-Processing.

Using a screw extruder, after the mixture material prepared in step 2 is melted and extruded by a screw, the melt may be extruded from a spinning port in a spunbond manner, to obtain a PP fiber bundle. A diameter of the spinning port may be approximately 12 μm.

The PP fiber bundle prepared in step 3 may ultimately form finished product through towing, netting, pressure-rolling, hot-rolling, winding, and inverted-cloth-slitting, and may be put into storage.

An oiling process may be performed on the towed fiber. The oil may include polyvinylpyrrolidone and emulsified silicone oil, and a mass ratio of polyvinylpyrrolidone and emulsified silicone oil in the oil may be approximately 3:7.

A temperature of the roller may be approximately 160° C., a pressure may be approximately 56 d/cm, and a temperature of the hot-rolling may be approximately 160° C.

A mixed fiber layer may be prepared by mixed laying, and the plant-based functional PP spunbond non-woven fabric may be obtained by hot-rolling with a pattern roller. A temperature of hot-rolling may be approximately 160° C. The obtained PP fiber non-woven fabric may have a ratio of a longitudinal over transverse breaking strength of 5.41.

Exemplary Embodiment 9

The present disclosure provides a preparation method of a plant-based functional polypropylene (PP) spunbond non-woven fabric. The preparation method may include following.

Step 1: Preparation of Modified Plant-Based Functional PP Masterbatch.

The polypropylene resin may be melted at a temperature of approximately 200° C. Antioxidants may be first added to the molten polypropylene resin, and then the molten polypropylene resin may be stirred at 800 rad/min for approximately 13 minutes to enable the components to be fully mixed. Modifier and water-soluble plant extract may be added to the molten polypropylene resin, and then the molten polypropylene resin may be stirred at a high speed for approximately 20 minutes-25 minutes to obtain a mixture and cooled to approximately 185° C.-187° C. Ultimately, the mixture may be extruded to obtain the modified plant-based functional polypropylene masterbatch.

Antioxidants may include dihydrotanshinone I, epicatechin and glycerin, and a mass ratio of dihydrotanshinone I, epicatechin, and glycerin in antioxidants may be approximately 5:1:3. Modifier may include sodium-n-methyl-n-oleyl taurate and cocamidopropyl betaine, and a mass ratio of sodium-n-methyl-n-oleyl taurate and cocamidopropyl betaine in the modifier may be approximately 0.1:3. A mass ratio of the modifier and the water-soluble plant extract may be approximately 0.1:10.

Step 2: Mixing.

The plant-based functional polypropylene masterbatch prepared in step 1 may be mixed with the conventional polypropylene raw material according to a mass ratio of the water-soluble plant extract in the plant-based functional polypropylene masterbatch over the total mass of the raw material of 1.2%, and a spinning melt may be prepared by melting.

Step 3: Spinning and Post-Processing.

Using a screw extruder, after the mixture material prepared in step 2 is melted and extruded by a screw, the melt may be extruded from a spinning port in a spunbond manner, to obtain a PP fiber bundle. A diameter of the spinning port may be approximately 12 μm.

The PP fiber bundle prepared in step 3 may ultimately form finished product through towing, netting, pressure-rolling, hot-rolling, winding, and inverted-cloth-slitting, and may be put into storage.

An oiling process may be performed on the towed fiber. The oil may include polyvinylpyrrolidone and emulsified silicone oil, and a mass ratio of polyvinylpyrrolidone and emulsified silicone oil in the oil may be approximately 1:3.

A temperature of the roller may be approximately 155-156° C., a pressure may be approximately 56-60 d/cm, and a temperature of the hot-rolling may be approximately 160° C.

A mixed fiber layer may be prepared by mixed laying, and the plant-based functional PP spunbond non-woven fabric may be obtained by hot-rolling with a pattern roller. A temperature of hot-rolling may be approximately 160° C. The obtained PP fiber non-woven fabric may have a ratio of a longitudinal over transverse breaking strength of 5.89.

Exemplary Embodiment 10

The present disclosure provides a preparation method of a plant-based functional polypropylene (PP) spunbond non-woven fabric. The preparation method may include following.

Step 1: Preparation of Modified Plant-Based Functional PP Masterbatch.

The polypropylene resin may be melted at a temperature of approximately 200° C. Antioxidants may be first added to the molten polypropylene resin, and then the molten polypropylene resin may be stirred at 800 rad/min for approximately 13-15 minutes to enable the components to be fully mixed. Modifier and water-soluble plant extract may be added to the molten polypropylene resin, and then the molten polypropylene resin may be stirred at a high speed for approximately 20 minutes to obtain a mixture and cooled to approximately 186-188° C. Ultimately, the mixture may be extruded to obtain the plant-based functional polypropylene masterbatch.

Antioxidants may include dihydrotanshinone I, epicatechin and glycerin, and a mass ratio of dihydrotanshinone I, epicatechin, and glycerin in antioxidants may be approximately 4:3:6. Modifier may include sodium-n-methyl-n-oleyl taurate and cocamidopropyl betaine, and a mass ratio of sodium-n-methyl-n-oleyl taurate and cocamidopropyl betaine in the modifier may be approximately 1:1. A mass ratio of the modifier and the water-soluble plant extract may be approximately 0.5:8.

Step 2: Mixing.

The plant-based functional polypropylene masterbatch prepared in step 1 may be mixed with the conventional polypropylene raw material according to a mass ratio of the water-soluble plant extract in the plant-based functional polypropylene masterbatch over the total mass of the raw material of 1.5%, and a spinning melt may be prepared by melting.

Step 3: Spinning and Post-Processing.

Using a screw extruder, after the mixture material prepared in step 2 is melted and extruded by a screw, the melt may be extruded from a spinning port in a spunbond manner, to obtain a PP fiber bundle. A diameter of the spinning port may be approximately 20 μm.

The PP fiber bundle prepared in step 3 may ultimately form finished product through towing, netting, pressure-rolling, hot-rolling, winding, and inverted-cloth-slitting, and may be put into storage.

An oiling process may be performed on the towed fiber. The oil may include polyvinylpyrrolidone and emulsified silicone oil, and a mass ratio of polyvinylpyrrolidone and emulsified silicone oil in the oil may be approximately 2:9.

A temperature of the roller may be approximately 160-162° C., a pressure may be approximately 60-62 d/cm, and a temperature of the hot-rolling may be approximately 165-167° C.

A mixed fiber layer may be prepared by mixed laying, and the plant-based functional PP spunbond non-woven fabric may be obtained by hot-rolling with a pattern roller. A temperature of hot-rolling may be approximately 160-162° C. The obtained PP fiber non-woven fabric may have a ratio of a longitudinal over transverse breaking strength of 6.14.

Exemplary Embodiment 11

Embodiment 11 for preparing a plant-based functional polypropylene (PP) spunbond non-woven fabric may be based on the above described exemplary Embodiment 6, except that the oiling process in step 3 of Embodiment 6 is omitted, while other processes may be the same as or similar with the processes in the exemplary Embodiment 6.

Exemplary Embodiment 12

Embodiment 12 for preparing a plant-based functional polypropylene (PP) spunbond non-woven fabric may be based on the above described exemplary Embodiment 7, except that the oiling process in step 3 of Embodiment 7 is omitted, while other processes may be the same as or similar with the processes in the exemplary Embodiment 7.

Exemplary Embodiment 13

Embodiment 13 for preparing a plant-based functional polypropylene (PP) spunbond non-woven fabric may be based on the above described exemplary Embodiment 8, except that the oiling process in step 3 of Embodiment 8 is omitted, while other processes may be the same as or similar with the processes in the exemplary Embodiment 8.

Exemplary Embodiment 14

Embodiment 14 for preparing a plant-based functional polypropylene (PP) spunbond non-woven fabric may be based on the above described exemplary Embodiment 9, except that the oiling process in step 3 of Embodiment 9 is omitted, while other processes may be the same as or similar with the processes in the exemplary Embodiment 9.

Exemplary Embodiment 15

Embodiment 15 for preparing a plant-based functional polypropylene (PP) spunbond non-woven fabric may be based on the above described exemplary Embodiment 10, except that the oiling process in step 3 of Embodiment 10 is omitted, while other processes may be the same as or similar with the processes in the exemplary Embodiment 10.

Exemplary Embodiment 16

Embodiment 16 for preparing a plant-based functional polypropylene (PP) spunbond non-woven fabric may be based on the above described exemplary Embodiment 6, except that the antioxidants in step 1 of Embodiment 6 are not added, while other processes may be the same as or similar with the processes in the exemplary Embodiment 6.

Exemplary Embodiment 17

Embodiment 17 for preparing a plant-based functional polypropylene (PP) spunbond non-woven fabric may be based on the above described exemplary Embodiment 7, except that the antioxidants in step 1 of Embodiment 7 are not added, while other processes may be the same as or similar with the processes in the exemplary Embodiment 7.

Exemplary Embodiment 18

Embodiment 18 for preparing a plant-based functional polypropylene (PP) spunbond non-woven fabric may be based on the above described exemplary Embodiment 8, except that the antioxidants in step 1 of Embodiment 8 are not added, while other processes may be the same as or similar with the processes in the exemplary Embodiment 8.

Exemplary Embodiment 19

Embodiment 19 for preparing a plant-based functional polypropylene (PP) spunbond non-woven fabric may be based on the above described exemplary Embodiment 9, except that the modifier in step 1 of Embodiment 9 is not added, while other processes may be the same as or similar with the processes in the exemplary Embodiment 9.

Exemplary Embodiment 20

Embodiment 20 for preparing a plant-based functional polypropylene (PP) spunbond non-woven fabric may be based on the above described exemplary Embodiment 10, except that the modifier in step 1 of Embodiment 10 is not added, while other processes may be the same as or similar with the processes in the exemplary Embodiment 10.

Exemplary Embodiment 21

Embodiment 21 for preparing a plant-based functional polypropylene (PP) spunbond non-woven fabric may be based on the above described exemplary Embodiment 6, except that the addition amount of the plant herb water-soluble extract is 0.05%, while other processes may be the same as or similar with the processes in the exemplary Embodiment 6.

Exemplary Embodiment 22

Embodiment 22 for preparing a plant-based functional polypropylene (PP) spunbond non-woven fabric may be based on the above described exemplary Embodiment 7, except that the addition amount of the plant herb water-soluble extract is 0.1%, while other processes may be the same as or similar with the processes in the exemplary Embodiment 7.

Exemplary Embodiment 23

Embodiment 23 for preparing a plant-based functional polypropylene (PP) spunbond non-woven fabric may be based on the above described exemplary Embodiment 8, except that the addition amount of the plant herb water-soluble extract is 1.6%, while other processes may be the same as or similar with the processes in the exemplary Embodiment 8.

Exemplary Embodiment 24

Embodiment 24 for preparing a plant-based functional polypropylene (PP) spunbond non-woven fabric may be based on the above described exemplary Embodiment 9, except that the addition amount of the plant herb water-soluble extract is 1.8%, while other processes may be the same as or similar with the processes in the exemplary Embodiment 9.

Exemplary Embodiment 25

Embodiment 25 for preparing a plant-based functional polypropylene (PP) spunbond non-woven fabric may be based on the above described exemplary Embodiment 10, except that the addition amount of the plant herb water-soluble extract is 2.0%, while other processes may be the same as or similar with the processes in the exemplary Embodiment 10.

The plant herb water-soluble extract in Embodiments 1-10 may include a honeysuckle extract, a mint extract, a wormwood extract, an echinacea polyphenols extract, an apple extract, a rose extract, a grass coral extract, a raspberry extract, a mulberry extract, a cinnamon extract, a ginger extract, or an angelica extract, etc. In certain embodiments, the plant herb water-soluble extract in Embodiments 1-10 may include any other suitable plant water-soluble extract.

The plant-based functional PP spunbond non-woven fabric in the present disclosure may have desired mechanical performance and softness. According to testing standards of "FZ T64004-93 thin bonding non-woven cloth" and "GB-T 8942-2002 paper-determination of softness", the mechanical properties and softness of the plant-based functional PP spunbond non-woven fabric in the present disclosure (with a same weight per unit area) may be shown in Table 1.

TABLE 1

| Embodiments | Mixed layering | | Softness and smoothness mN | Longitudinal over transverse breaking strength ratio |
| | Longitudinal (N) | Transverse (N) | | |
| --- | --- | --- | --- | --- |
| Embodiment 6 | 28.9 | 4.8 | 17 | 6.02 |
| Embodiment 7 | 27.1 | 5.2 | 14 | 5.21 |
| Embodiment 8 | 26.5 | 4.9 | 15 | 5.41 |
| Embodiment 9 | 26.0 | 4.5 | 15 | 5.89 |
| Embodiment 10 | 25.8 | 4.2 | 22 | 6.14 |
| Embodiment 11 | 28.9 | 4.8 | 11 | 6.02 |
| Embodiment 12 | 27.1 | 5.2 | 10 | 5.21 |
| Embodiment 13 | 26.5 | 4.9 | 9 | 5.41 |
| Embodiment 14 | 26.0 | 4.5 | 9 | 5.89 |
| Embodiment 15 | 25.8 | 4.2 | 12 | 6.14 |

By comparing Embodiments 11-15 with Embodiments 6-10, according to Table 1, under the conditions of consistent weight per unit area and consistent longitudinal over transverse breaking strength ratio, the plant-based functional PP spunbond non-woven fabric in the present disclosure may have desired strength and softness. The softness of the non-woven fabric fabricated in Embodiments 6-10 may be improved by more than 100%. Therefore, in addition to the structure change, the main indexes, such as strength and softness, etc., of the plant-based functional PP spunbond non-woven fabric in the present disclosure may be greatly related to the polyvinylpyrrolidone and emulsified silicone oil added to the spinning solution before spinning. More particularly, in Embodiment 10, the polyvinylpyrrolidone and emulsified silicone oil with a mass ratio of 2:9 may be added, and the prepared plant-based functional PP spunbond non-woven fabric may have substantially desired softness and suitable strength. As a medical non-woven fabric, the softness is a substantially important measurement index.

According to ISO9073-15 testing stand for breathability of the material, conventional moisture regain test for moisture regain, and comparison for coloring, the breathability, moisture regain, and coloring observation of the plant-based functional PP spunbond non-woven fabric in Embodiments 6-10 and Embodiments 16-20 may be shown in Table 2.

TABLE 2

Performance test results of plant-based functional PP spunbond non-woven fabric in Embodiments 16-20

| | Water-soluble plant extract content (%) | Breathability (mm/s) | Moisture regain (%) | Degree of coloring |
| --- | --- | --- | --- | --- |
| Embodiment 6 | 0.2 | 958 | 0.4 | Uniform |
| Embodiment 7 | 0.6 | 964 | 1.1 | Uniform |
| Embodiment 8 | 1.0 | 968 | 1.6 | Uniform |
| Embodiment 9 | 1.2 | 975 | 2.0 | Uniform |
| Embodiment 10 | 1.5 | 978 | 2.6 | Uniform |
| Embodiment 16 | 0.2 | 957 | 0.4 | Pattern |
| Embodiment 17 | 0.6 | 966 | 1.1 | Pattern |
| Embodiment 18 | 1.0 | 970 | 1.6 | Pattern |
| Embodiment 19 | 1.2 | 974 | 1.3 | Uniform |
| Embodiment 20 | 1.5 | 980 | 1.7 | Uniform |

According to Table 2, the plant-based functional PP spunbond non-woven fabric in the present disclosure may have desired breathability and hygroscopicity.

Because the modifier and the water-soluble plant extract are simultaneously added, while the plant extract, modifier, and polypropylene raw materials have a relatively fixed mass ratio, to meet the basic physical properties of the prepared PP non-woven fabric and water-absorbing performance, and to minimize production cost, the content of the plant herb water-soluble extract may be in a range of approximately 0.2-1.5%.

According to the results of Embodiments 16-18 in Table 2, the addition of antioxidants may have great impact on the coloring of the plant-based functional PP spunbond non-woven fabric in the present disclosure. The antioxidants may mainly prevent the water-soluble plant extract from changing color when being added to the high-temperature polypropylene. The antioxidants may be first added into the melted polypropylene, and then the modifier may be added into the melted polypropylene. The main reason may include that after adding the antioxidants, the molten polypropylene fiber may have stronger antioxidant performance. When adding the water-soluble plant extract, the plant extract may be prevented from changing color at a high temperature, thereby preventing the occurrence of coloring.

According to the results of Embodiments 19-20 in Table 2, the modifier may have substantially great impact on the hygroscopicity of the plant-based functional PP spunbond non-woven fabric in the present disclosure. The modifier may improve the dispersibility of the added water-soluble plant extract, to enable the water-soluble plant extract to be evenly dispersed into the melted polypropylene. At the same time, the cocamidopropyl betaine may tend to be mixed with the water-soluble plant extract at a high temperature, to enable the prepared fiber to have microporous network structure, such that the prepared polypropylene fiber may have desired moisture regain and moisture absorption characteristics.

TABLE 3

Related index measurement results of the plant-based functional PP spunbond non-woven fabric in Embodiments 21-25

| | Water-soluble plant extract content (%) | Mixed layering Longitudinal (N) | Moisture regain (%) |
|---|---|---|---|
| Embodiment 6 | 0.2 | 28.9 | 0.4 |
| Embodiment 7 | 0.6 | 27.1 | 1.1 |
| Embodiment 8 | 1.0 | 26.5 | 1.6 |
| Embodiment 9 | 1.2 | 26.0 | 2.0 |
| Embodiment 10 | 1.5 | 25.8 | 2.6 |
| Embodiment 21 | 0.05 | 29.2 | 0.03 |
| Embodiment 22 | 0.1 | 27.8 | 0.1 |
| Embodiment 23 | 1.8 | 18.1 | 2.7 |
| Embodiment 24 | 1.9 | 17.6 | 2.9 |
| Embodiment 25 | 2.0 | 17.5 | 3.0 |

The plant-based functional PP spunbond non-woven fabric in the present disclosure may have a moisture regain of 0.2-3%, a longitudinal breaking strength ≥18.5 N/5 cm, and a transverse breaking strength ≤9.5 N/5 cm.

According to Table 3, when the content of the water-soluble plant extract in the plant-based functional PP spunbond non-woven fabric is less than 0.2%, the moisture regain thereof may be too low. When the content of the water-soluble plant extract is greater than 1.5%, the physical strength of the prepared non-woven fabric may be too low (average value may be lower than normal by more than 20%). Therefore, the content of the water-soluble plant extract in the plant-based functional PP spunbond non-woven fabric may be in a range of approximately 0.2%-1.5%.

The disclosed embodiments may have following beneficial effects. The PP spunbond non-woven fabric in the present disclosure may contain 0.2-1.5% of plant herb water-soluble extract. The PP spunbond non-woven fabric may be modified by adding the plant extract. Therefore, the PP spunbond non-woven fabric may have desired plant functionality, hygroscopicity and flexibility without affecting the strength of the fiber.

By adding the antioxidants, the water-soluble plant extract may be prevented from changing color when being added to high-temperature polypropylene, such that the fiber color problem may be avoided.

The antioxidants may be first added into the melted polypropylene, and then the water-soluble plant extract may be added into the melted polypropylene. The main reason may include that after adding the antioxidants, the molten polypropylene fiber may have stronger antioxidant performance. When adding the water-soluble plant extract, the plant extract may be prevented from changing color at a high temperature, thereby preventing the occurrence of coloring issue.

The modifier may be added to improve the dispersibility of the water-soluble plant extract, to enable the water-soluble plant extract to be evenly dispersed into the melted polypropylene. At the same time, the cocamidopropyl betaine may tend to be mixed with the water-soluble plant extract at a high temperature, to enable the prepared fiber to have microporous network structure, such that the prepared polypropylene fiber may have desired moisture regain (in a range of approximately 0.2%-3%) and moisture-absorbing characteristics.

The PP spunbond non-woven fabric in the present disclosure may have a longitudinal breaking strength of ≥18.5 N/5 cm, a transverse breaking strength of ≤9.5 N/5 cm, a longitudinal over transverse breaking strength ratio of ≥1.95, a thickness in a range of approximately 0.2 mm-0.5 mm, a weight per unit area in a range of approximately 20 g/m$^2$-40 g/m$^2$, a PP fiber diameter in a range of approximately 10 μm-30 μm. The PP spunbond non-woven fabric may overall have desired soft and smooth hand feeling.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A preparation method of a plant-based functional polypropylene spunbond non-woven fabric, comprising:
preparing a modified plant-based functional polypropylene masterbatch, including:
melting a polypropylene resin,
adding antioxidants into the molten polypropylene resin and stirring for forming a fully mixed component, the antioxidants including a combination of dihydrotanshinone I, epicatechin, and glycerin, and
after forming the fully mixed component, adding a modifier and a plant herb water-soluble extract into the fully mixed component comprising the antioxidants and the molten polypropylene resin, the modifier including a combination of sodium-n-methyl-n-oleyl taurate and cocamidopropyl betaine,
mixing the modified plant-based functional polypropylene masterbatch with a polypropylene raw material to obtain a polypropylene mixture, preparing a spinning melt by melting the polypropylene mixture, preparing a polypropylene fiber bundle by performing a spinning process of the spinning melt performing a post-processing process on the polypropylene fiber bundle, the post-processing process including towing, netting, pressure-rolling, hot-rolling, winding of the polypropylene fiber bundle after the towing and before the pressure rolling of the polypropylene fiber bundle, performing an oiling process on the polypropylene fiber bundle using an oil including a combination of polyvinylpyrrolidone and emulsified silicone oil.

2. The method according to claim 1, wherein:

a melting temperature for melting the polypropylene resin is in a range of approximately 195° C.-220° C.;

after adding the antioxidants, the molten polypropylene resin and the antioxidants is stirred at approximately 800 rad/min-1000 rad/min for approximately 10 minutes-15 minutes, thereby forming the fully mixed component; and when adding the modifier and the plant herb water-soluble extract, the fully mixed component comprising the antioxidants and the molten polypropylene resin is stirred for approximately 20 minutes-40 minutes and cooled to approximately 180° C.-190° C.

3. The method according to claim 1, wherein:

a mass ratio of dihydrotanshinone I, epicatechin, and glycerin is approximately (1-5):(1-3):(3-10).

4. The method according to claim 1, wherein:

a mass ratio of sodium-n-methyl-n-oleyl taurate and cocamidopropyl betaine is approximately (0.1-0.5): (0.5-3).

5. The method according to claim 1, wherein a mass ratio of the plant herb water-soluble extract in the plant-based functional polypropylene masterbatch over the polypropylene raw material is in a range of approximately 0.2%-1.5%.

6. The method according to claim 1, wherein:

performing the spinning process includes using a screw extruder, extruding the spinning melt from a spinning port in a spunbond manner, to prepare the polypropylene fiber bundle; and for performing the pressure rolling, a temperature of a roller is in a range of approximately 140° C.-165° C., and a pressure is in a range of approximately 56 d/cm-70 d/cm, and for performing the hot-rolling, a temperature of the hot-rolling is in a range of approximately 160° C.-170° C.

7. The method according to claim 6, wherein:

a diameter of the spinning port is in a range of approximately 10 μm-30 μm.

8. The method according to claim 6, wherein:

a mass ratio of the polyvinylpyrrolidone and the emulsified silicone oil is in a range of approximately (1-3): (3-9).

9. The method according to claim 1, wherein:

the plant herb water-soluble extract includes a honeysuckle extract, a mint extract, a wormwood extract, an echinacea polyphenols extract, an apple extract, a rose extract, a grass coral extract, a raspberry extract, a mulberry extract, a cinnamon extract, a ginger extract, an angelica extract, or a combination thereof.

10. The method according to claim 1, wherein:

a mass ratio of the modifier and the plant herb water-soluble extract is in a range of approximately (0.1-0.5): (8-10).

11. The method according to claim 1, further including:

a hot rolling with a pattern roller, wherein a temperature of the hot rolling is in a range of approximately 160° C.-168° C.

12. The method according to claim 1, wherein the plant-based functional polypropylene spunbond non-woven fabric has:

moisture regain in a range of approximately 0.2%-3%;

a longitudinal breaking strength of approximately ≥18.5 N/5 cm; and a transverse breaking strength of approximately ≤9.5 N/5 cm.

13. The method according to claim 1, wherein the plant-based functional polypropylene spunbond non-woven fabric has:

a thickness in a range of approximately 0.2 mm-0.5 mm, a weight per unit area in a range of approximately 20 g/m²-40 g/m², and a polypropylene fiber diameter in a range of approximately 10 μm-30 μm.

\* \* \* \* \*